United States Patent

Buchter et al.

[11] Patent Number: 5,911,444
[45] Date of Patent: Jun. 15, 1999

[54] AUTOMATIC LOCKING MECHANISM FOR AIR BRAKE HOSE COUPLING MEMBERS

[75] Inventors: Randolph Lee Buchter, Harrisburg; David James Fabian, Mount Joy, both of Pa.

[73] Assignee: The Whitaker Corporation, Wilmington, Del.

[21] Appl. No.: 09/049,295

[22] Filed: Mar. 27, 1998

Related U.S. Application Data

[63] Continuation-in-part of application No. 08/848,110, Apr. 28, 1997, abandoned, which is a continuation-in-part of application No. 08/786,689, Jan. 22, 1997, abandoned
[60] Provisional application No. 60/010,912, Jan. 31, 1996.
[51] Int. Cl.[6] ..................................................... F16L 35/00
[52] U.S. Cl. .............................. 285/69; 285/83; 285/306; 285/382
[58] Field of Search ................................ 285/69, 83, 306, 285/382

[56] References Cited

U.S. PATENT DOCUMENTS

| | | | |
|---|---|---|---|
| 1,159,927 | 11/1915 | Gold et al. ........................... | 285/83 X |
| 1,209,673 | 12/1916 | Coggin et al. ......................... | 285/77 |
| 1,636,687 | 7/1927 | Farmer ................................ | 285/306 X |
| 1,706,051 | 3/1929 | Auchincloss ......................... | 285/83 X |
| 1,892,953 | 1/1933 | Johnson ............................. | 285/306 X |
| 3,383,123 | 5/1968 | Murray ................................ | 285/83 |
| 3,879,066 | 4/1975 | Kozinski ............................... | 285/69 |
| 3,892,431 | 7/1975 | Booth ................................. | 285/79 |
| 5,388,864 | 2/1995 | Kozinski .............................. | 285/78 |
| 5,410,894 | 5/1995 | Fox et al. ............................. | 70/14 |
| 5,586,688 | 12/1996 | Miller ................................ | 213/1.3 |

FOREIGN PATENT DOCUMENTS

| | | | |
|---|---|---|---|
| 0665148A1 | 8/1995 | European Pat. Off. ........ | B60T 17/04 |
| 324618 | 9/1920 | Germany ........................ | 285/69 |
| 4315089A1 | 11/1994 | Germany ........................ | F16L 37/12 |

OTHER PUBLICATIONS

International Search Report; 16390 PCT; PCT/US 97/01605; 3 Pages; International Filing Date Jan. 30, 1997.

*Primary Examiner*—Dave W. Arola
*Attorney, Agent, or Firm*—Katherine A. Nelson; Mary K. Van Atten

[57] ABSTRACT

An air pressure actuated stop assembly (50) is disposed in at least one of first and second rotatably engaging housings of a coupling assembly (10), the housings (14) being affixed to ends of respective associated hoses 70) to complete an air passageway (24) therebetween when coupled. Each housing (14) has a portion with an exterior surface adjacent an interior surface of a complementary portion of the other housing (14) and rotatably slidable therealong during coupling and uncoupling of the assembly (10). The stop assembly (50) includes a spring biased pin (52) that moves when actuated by air pressure in the air brake hose (70) to a position to obstruct the path traveled by the portion of the opposite housing (14) in a direction uncoupling the two housings (14) thereby preventing rotational uncoupling of the housings (14) when the air brake system is pressurized. The pin (52) is automatically retracted when the air pressure is released thus permitting the housings (14) to be uncoupled.

18 Claims, 13 Drawing Sheets

AUTOMATIC LOCKING MECHANISM FOR AIR BRAKE HOSE COUPLING MEMBERS

RELATED APPLICATIONS

This application is a continuation-in-part of U.S. patent application Ser. No. 08/848,110, filed Apr. 28, 1997; now abandoned, which in turn is a continuation-in-part of U.S. patent application Ser. No. 08/786,689, filed Jan. 22, 1997; now abandoned, which in turn claims the benefit of U.S. Provisional Application Ser. No. 60/010,912, filed Jan. 31, 1996.

FIELD OF THE INVENTION

This invention relates to air hose coupling members for detachably connecting the ends of air brake hoses for trucks or railroad cars to form an air-tight connection. More particularly, the invention relates to a locking mechanism for a pneumatic braking system for preventing accidental rotational separation of joined coupling members.

BACKGROUND OF THE INVENTION

Pneumatic brake systems having flexible air hoses are typically used between adjacent railroad cars and with certain types of trucks. A coupling member is attached to each end of a flexible air hose for detachably connecting the air hose sections together. The sections extend from the braking system of each car when the individual railroad cars are joined to form a unit train. These coupling members, which are joined together by a rotational downward motion, engage mating flanges and lips that extend from the housings of the coupling member. In most instances the coupling members are suspended between the cars and hang a short distance above the railroad tracks. Occasionally, the coupling members become uncoupled prematurely when the hoses are subjected to a sudden upward movement caused by the motion of the railroad cars. This accidental separation of the coupling members between two sections of air hose during the operation of the train causes the emergency brakes to be applied resulting in delay and inconvenience and presenting potential safety problems.

It is desirable, therefore, to have an anti-disconnect device that prevents inadvertent rotational disengagement. It is further desirable, however, that the anti-disconnect device not prevent disengagement when a longitudinal force is applied along the length of the hoses such as occurs when two cars are uncoupled.

U.S. Pat. Nos. 3,892,431, 3,879,066 and 5,388,864 disclose examples of known locking devices for air brake hoses. The device in the '431 patent requires that a spring loaded outwardly extending member be manually depressed before the coupling housings may be engaged or separated by rotating the coupling housings with respect to each other. The '066 patent discloses a locking device that is gravity activated. The '864 patent discloses a locking device that is manually operated by railroad employees when they are engaging the air hoses between the cars.

In the standard pneumatic braking system, the air pressure in the system maintains the brakes in an "off" position. Activation of the braking system is caused by a drop in the pressure. A locking system to prevent accidental disengagement is limited to one that is independent of the amount of pressure in the pneumatic brake lines or ones that must work within the normal operating range of the brake system, usually 50 to 90 p.s.i. The braking systems of the prior art are manually operated.

In an electro-pneumatic operated brake system, on the other hand, the air pressure in the hoses is held constant. The brakes are activated by electrical signals rather than by fluctuations in the pressure in the air hoses. Thus, it is desirable for the electro-pneumatic system to have a locking system that is automatically engaged when the system is pressurized.

SUMMARY OF THE INVENTION

The present invention is directed to an automatic locking mechanism that alleviates the problems associated with the prior art. In accordance with the invention, the locking mechanism for an air brake hose assembly is an air pressure actuated stop assembly secured in at least one of the housings of the coupling members. The coupling member assembly includes first and second rotatably engagable housings that are affixed to ends of respective associated hoses to complete an air passageway therebetween when coupled. Each of the housings has a portion with an exterior surface adjacent an interior surface of a complementary portion of the other housing and slidable therealong during coupling and uncoupling of the housings. The air pressure actuated stop assembly is disposed in this portion of one of the housings. When actuated by air pressure in the air brake hose, the stop assembly is movable to a position to obstruct the path traveled by the portion of the opposite housing in a direction uncoupling the two housings thereby preventing uncoupling of the housings when the air brake system is pressurized.

In accordance with the invention, at least one of the coupling housings includes a bore extending from communication with an exterior surface thereof and into communication with an air passageway of the coupling member. The bore has a first portion dimensioned to slidingly receive a stop assembly, a second portion having a diameter smaller than the first portion, and a tapered transition portion extending therebetween. In a preferred embodiment, the releasable stop assembly includes a pin, a spring and a retaining bushing. The pin includes a head or flange portion at one end thereof dimensioned to be slidingly received into and be movable along the first bore portion with a relatively air tight fit. A shaft extends outwardly from the flange surface and is dimensioned to receive the spring. The pin and spring are secured in the first passageway portion by a retaining bushing dimensioned to be press fit in the first bore portion. The pin remains in the bore and is biased inwardly to withdraw the shaft end within the bore when the air hose is not under pressure. Upon coupling the housings together and charging the brake system with air, the pressurized air enters the second bore portion, passes into the transition portion and is distributed across the stop surface of the flange and the resultant force moves the pin outwardly against spring bias such that the pin extends beyond the housing and prevents the coupled housings from being rotationally uncoupled. The pin remains in the extended position as long as the brake system is pressurized above some minimum amount, such as for example, 50 p.s.i.

Upon releasing the pressure in the air hoses, the spring biases the shaft end inwardly, thereby permitting the coupled housings to be rotationally separated.

The stop assembly is located on the coupling member or gladhand at a selected location that permits the coupling member or gladhands to rotate within a desired range while preventing the gladhands from rotating a sufficient distance to become disconnected. The stop assembly, furthermore, is located such that it will not interfere with disengagement of the hoses by pulling in an axial direction when two cars are disconnected from each other.

The invention further includes alternative embodiments of the stop assembly in which the assembly is a self-contained unit that may be disposed in a bore of a coupling member.

The present invention has the advantage of providing for axial disengagement of two interlocking coupling members while simultaneous preventing rotational disengagement. The present invention further has the advantage of being operated automatically when the pressure line is charged thus eliminating manual engagement of the pin as a locking device. This feature is particularly important for electro-pneumatic systems that have electrical connectors secured to or as part of the coupling housings, such as the system disclosed in U.S. patent application Ser. No. 08/708,435 and International Patent Application No. WO 97/09754.

The present invention provides an automatic locking system that eliminates the problem of someone inadvertently failing to engage the system and also minimizes the time required to manipulate the hose coupling members, known as gladhands, when engaging the system between the cars.

The locking mechanism of the present invention furthermore is cost effective to install and may be provided on the coupling member with a minimum amount of materials and labor.

Embodiments of the invention will now be described by way of example with reference to the following drawings.

BRIEF DESCRIPTION OF THE DRAWINGS

FIG. 3 is an enlarged fragmentary view of the coupling housing of FIG. 1 with the outer structure broken away to show the structure of the bore for receiving the stop assembly.

DETAILED DESCRIPTION OF THE EMBODIMENTS

Figures 1, 12:
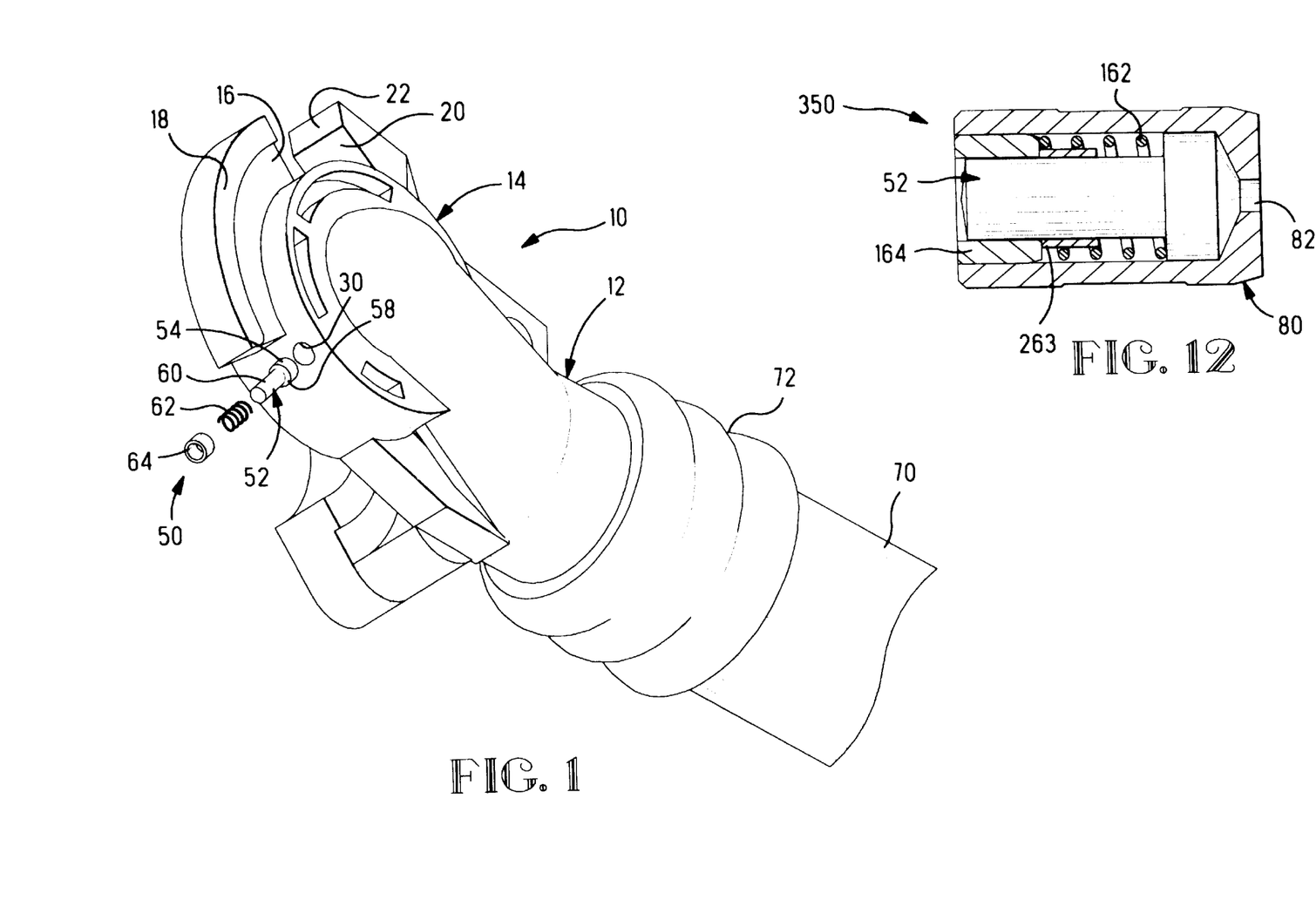
FIG. 1 is an isometric view of a hose coupling member made accordance with the invention attached to an air hose and having the air pressure actuated stop assembly exploded therefrom.
FIG. 12 is a sectional view illustrating another embodiment of a self-contained stop assembly of the present invention.
Figures 2, 3B:
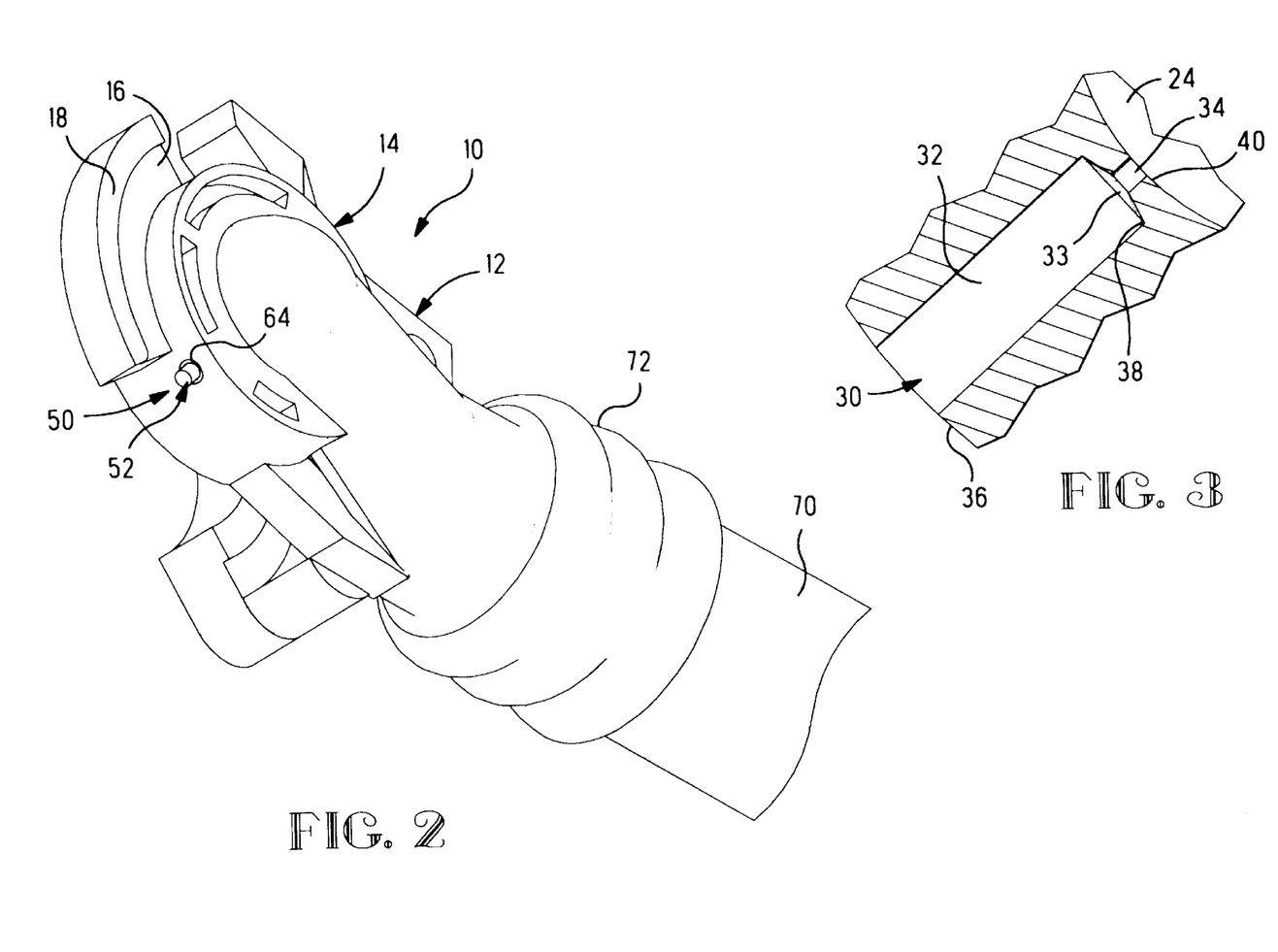
FIG. 2 is an isometric view of the coupling member of FIG. 1 with the stop assembly positioned in the coupler housing and in its extended or stop position.

Referring now to FIGS. 1 and 2, coupler assembly 10 includes a coupling member 12 mounted to an air hose 70 with clamp 72. Each coupling member 12 includes a housing 14 having an arcuate flange 16 with interlockable grooves and lips 18 and stop surfaces 20 and 22. The housing 14 of coupling member 12 or gladhand, as known in the art, is matable with a like member by rotatably engaging the two coupling members 12 and interlocking the cooperating grooves and lips. The gladhands pivot with respect to one another when coupled so that when a train travels around a curve the rotatable coupling member compensates for compressive forces in the hoses 70. The stop surfaces 20 and 22 engage complementary surfaces of the mating housing 14 to prevent excessive rotation of the two housings 14 with respect to each other when the housings 14 are rotated in the first direction to couple the gladhands together, as shown in FIGS. 6 and 7.

Figure 4:
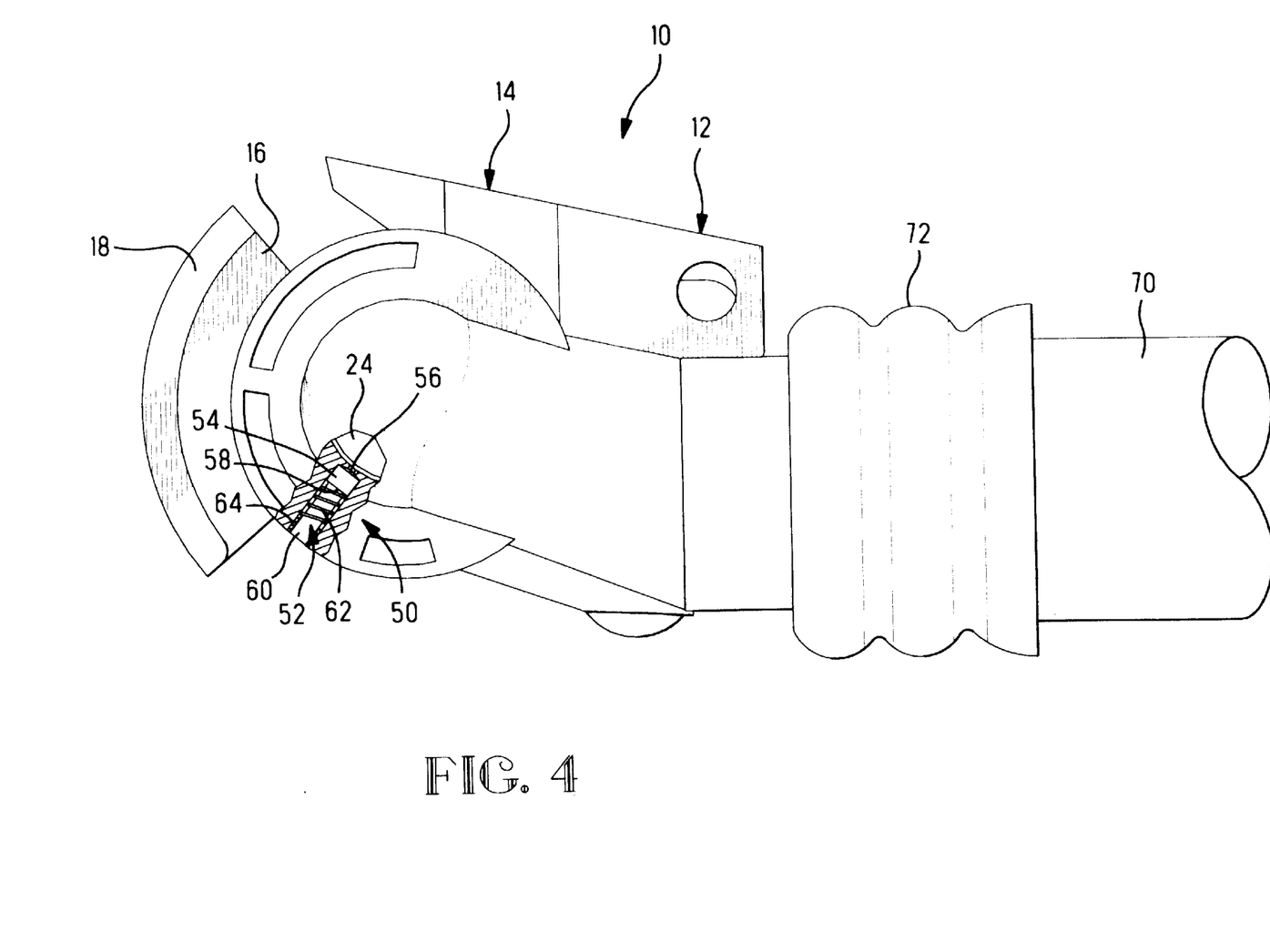
FIG. 4 is a view similar to that of FIG. 2 with the members of the air pressure actuated stop assembly disposed within the housing bore in its unextended position when the braking system is not under pressure.
Figure 5:
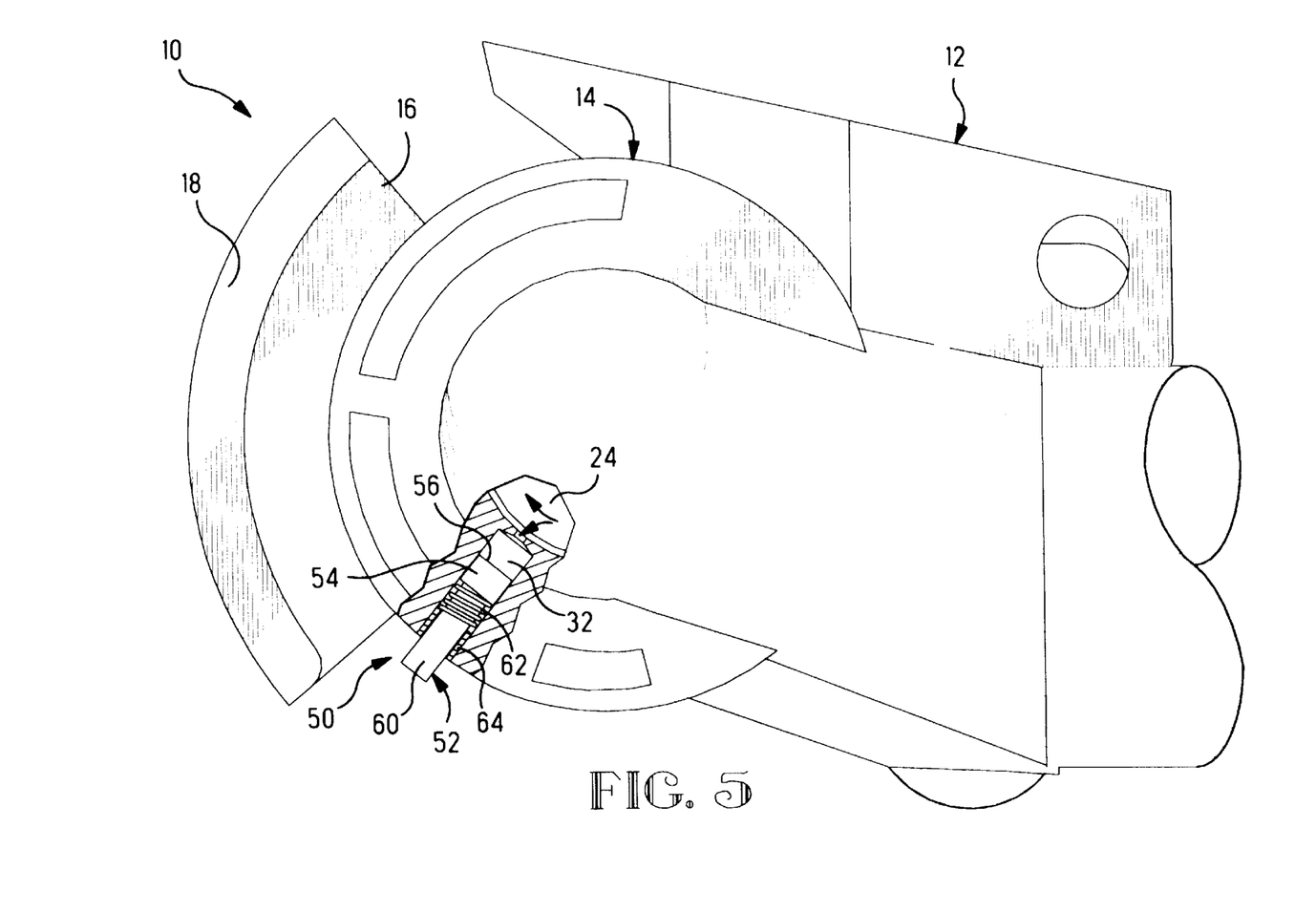
FIG. 5 is a view similar to that of FIG. 4 illustrating the position of the stop assembly when the brake system is a pressure.

Coupling housing 14 also includes a bore 30 as shown in FIGS. 3, 4 and 5 dimensioned to receive an air pressure actuated stop assembly 50 including a pin 52, a return spring 62, and a retaining bushing 64. As best seen in FIG. 3, bore 30 is in communication with the outer surface 36 of housing 14 and in communication with air passageway 24 of the coupling 12. Bore 30 includes first portion 32 dimensioned to receive pin 52, a second portion 34 having a smaller diameter in communication with air passageway 24 and a tapered intermediate portion 33 that extends from the inner end of the first portion 32 to the second portion 34. First portion 32 includes a stop surface 38 adjacent tapered transition portion 33. Pin 52 includes a head or enlarged flange portion 54 at the inner end having a first stop surface 56 which engages the first bore portion stop surface 38 and a second stop surface 58 on the opposed flange surface adapted to receive an end of the spring 62. Pin shaft 60 extends from flange stop surface 58 to an outer end and is dimensioned to receive the spring member 62 such that the spring rests against the stop surface 58 at the inner end thereof. The pin and spring are received in the first bore portion 32 and secured therein by the retaining bushing 64, which is secured in the bore 30 in an interference fit. The flange portion is dimensioned to be slidingly received into and be movable along the first bore portion 32 in a relatively air-tight fit.

FIG. 4 shows the air pressure activated stop assembly 50 disposed in the bore 30 with the pin 52 retracted and spring 62 extended within the first bore portion 32 when the system is not under pressure. FIG. 5 illustrates the position of the stop assembly 50 when the lines have been pressurized. As can be seen from FIG. 5, as the pressurized air passes through passageway 24, shown representatively by an arrow, some of the air enters second bore portion 34, and engages the entire rear stop surface 56 of the flange 54. When the air pressure is sufficient to overcome the biasing force of the return spring, flange 54 is forced outwardly against the spring and retaining bushing 64 until the spring 62 is compressed between the flange 54 and the bushing 64 and shaft 60 of pin 52 is moved to an extended position to obstruct the path traveled by a portion of the opposite housing in a direction uncoupling the two housings 14. The stop assembly automatically moves to the recessed position when the air pressure no longer has sufficient pressure to overcome the biasing force of the return spring.

Figure 6:
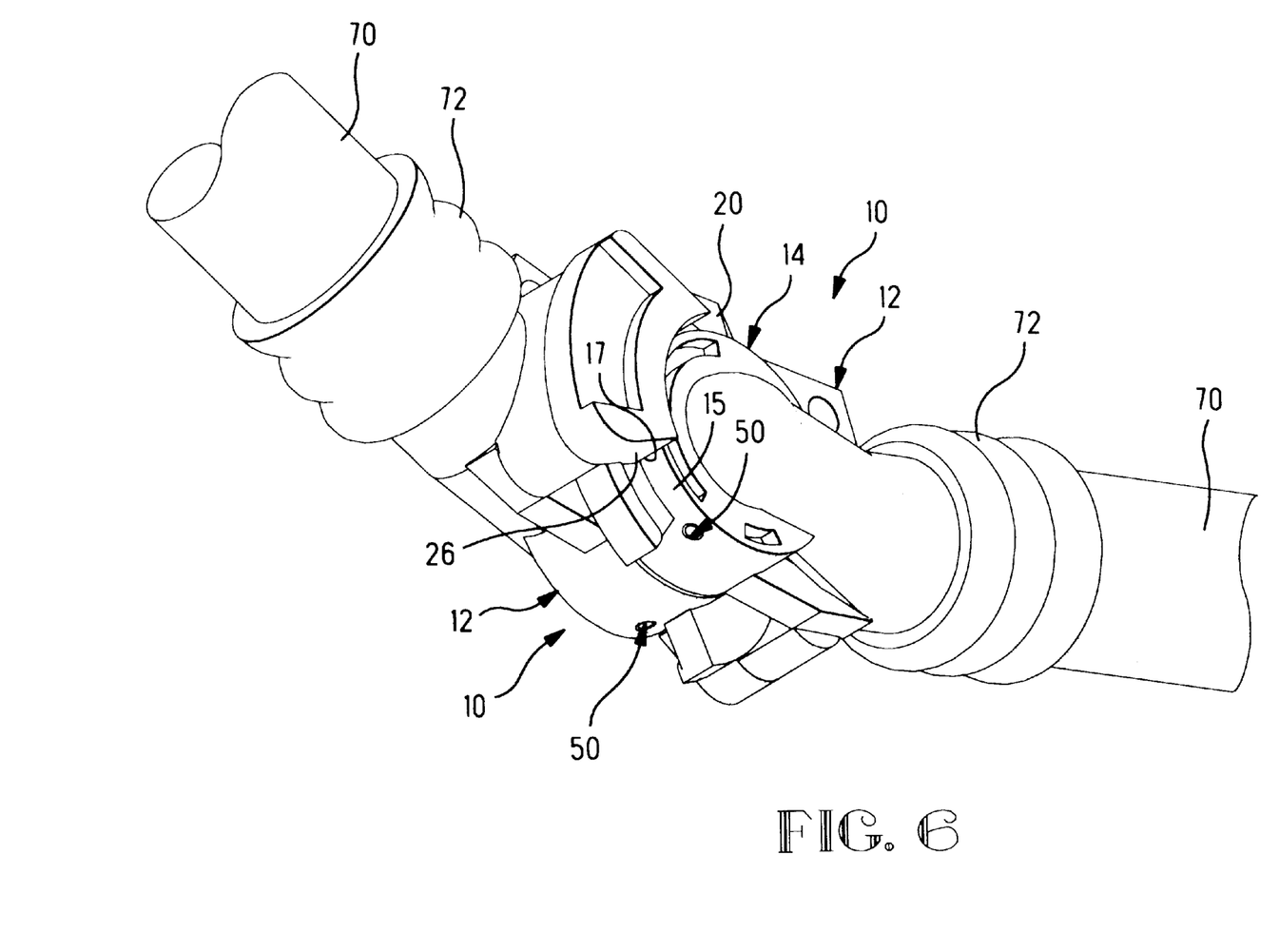
FIG. 6 is an isometric view of two coupling members joined together prior to the brake system being charged with air.
Figure 7:
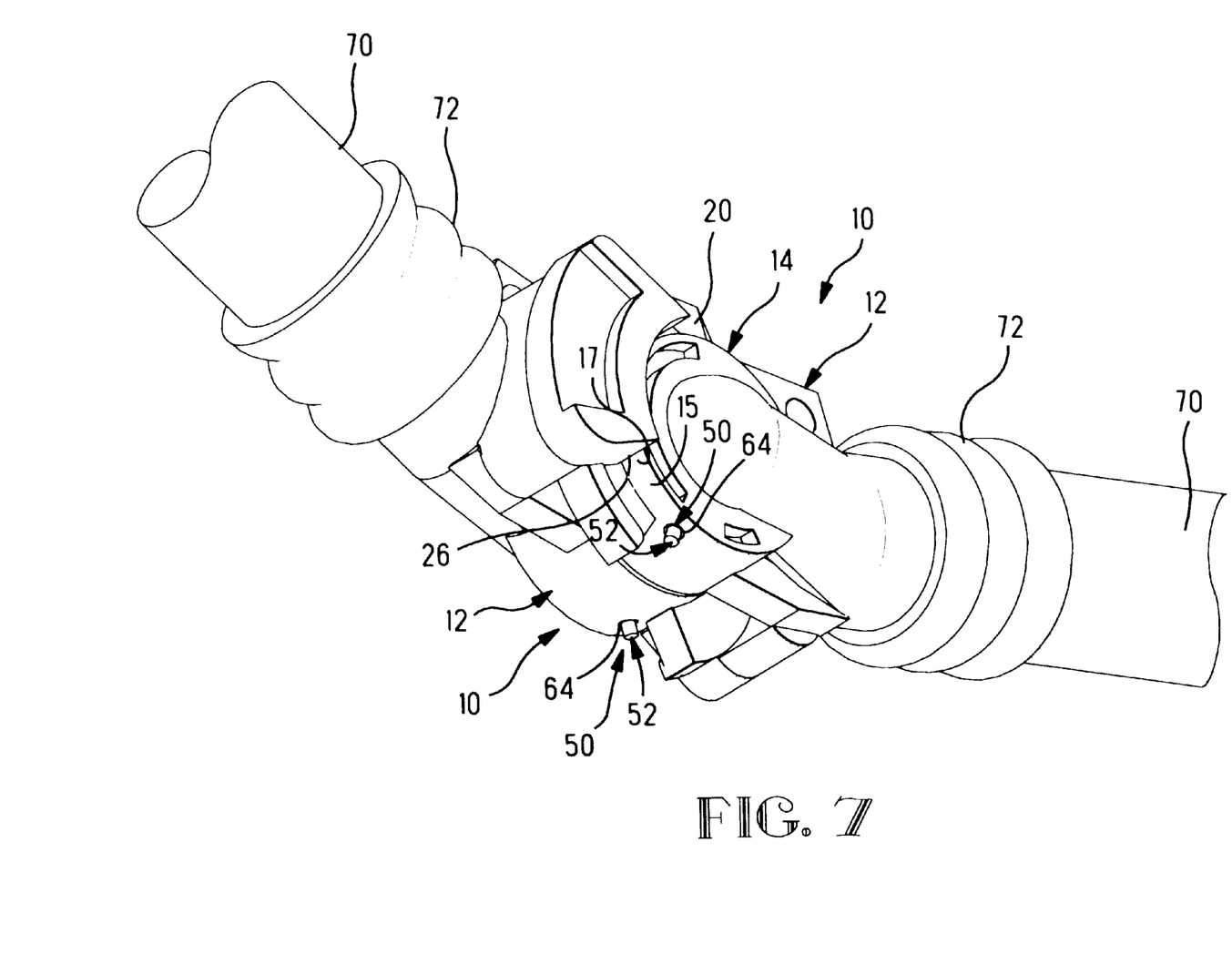
FIG. 7 is a view similar to that of FIG. 6 showing the position of the air pressure actuated stop assemblies after the brake system has been charged with air.

FIGS. 6 and 7 illustrate a mated coupling member or gladhand arrangement with both of the coupling members 12 having the air pressure actuated stop assembly 50 of the present invention with FIG. 6 showing the assembly prior to charging the pneumatic brake lines and FIG. 7 after the pneumatic brake lines have been charged.

As can be seen in FIGS. 6 and 7, each coupling housing 14 includes a portion having an exterior surface 15 adjacent an interior surface 17 of the other housing 14, the respective surfaces being slidably movable along a semicircular path during coupling and uncoupling. As can best be seen in FIG. 7, the stop assembly 50, when activated, moves to a position to obstruct movement of inner surface 17 along exterior surface 15. When end surface 26 engages outwardly extending pin shaft 60, further movement in the same direction is ceased thereby preventing uncoupling of housings 14.

The air pressure generally required for the electro-pneumatic braking system is about 90 p.s.i. with the dimensions of the bore and flange of the pin being adapted to activate the system at a pressure of at least 50 p.s.i.

Figure 8:
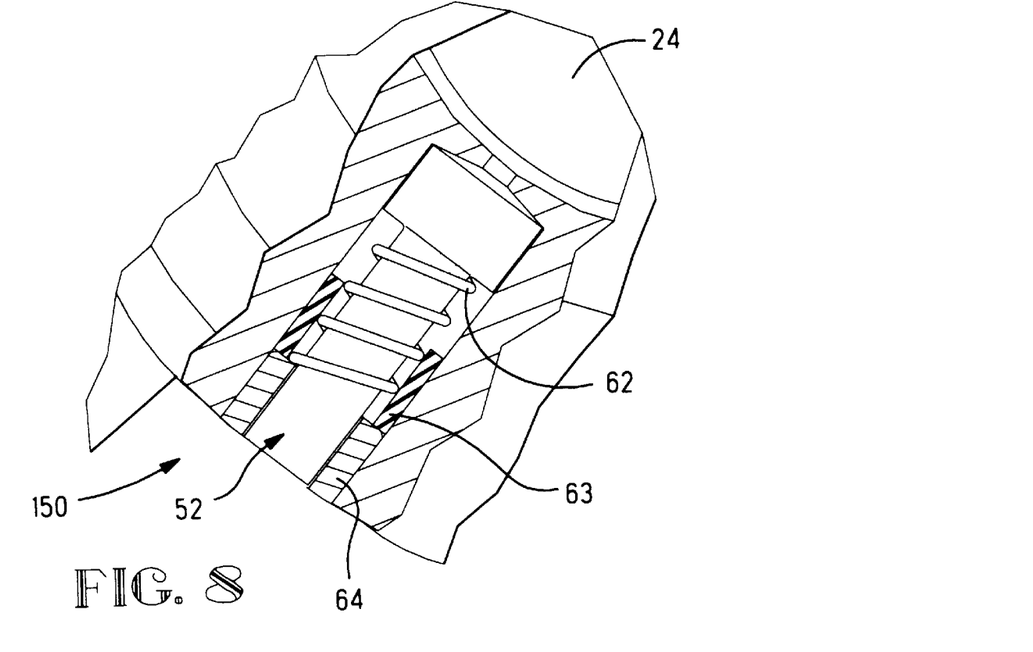
FIG. 8 is an enlarged fragmentary view of the an alternative embodiment of the stop assembly disposed within the housing bore in its unextended position when the braking system is not under pressure.
Figure 9:
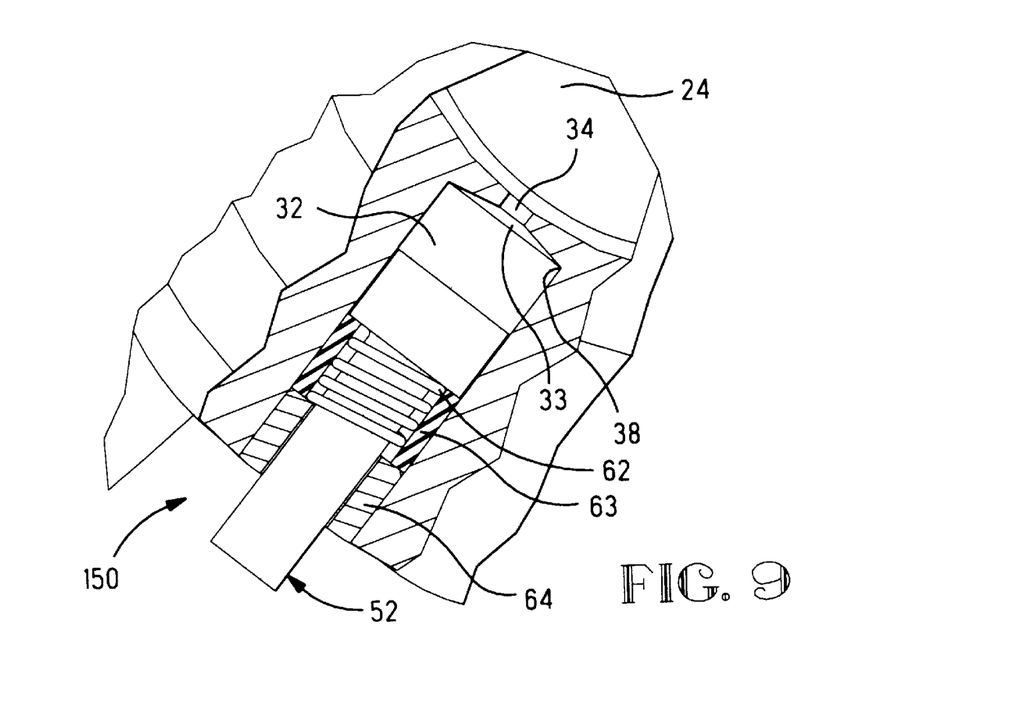
FIG. 9 is a view similar to that of FIG. 8 illustrating the position of the stop assembly of FIG. 8 when the brake system is under pressure.

FIGS. 8 and 9 show an alternative embodiment 150 of the stop assembly that include the addition of an elastomeric sleeve 63 that functions as an air seal at the forward end of the bore 30 proximate bushing 64 to assure there are no air leaks at the air actuated stop assembly.

Figure 10:
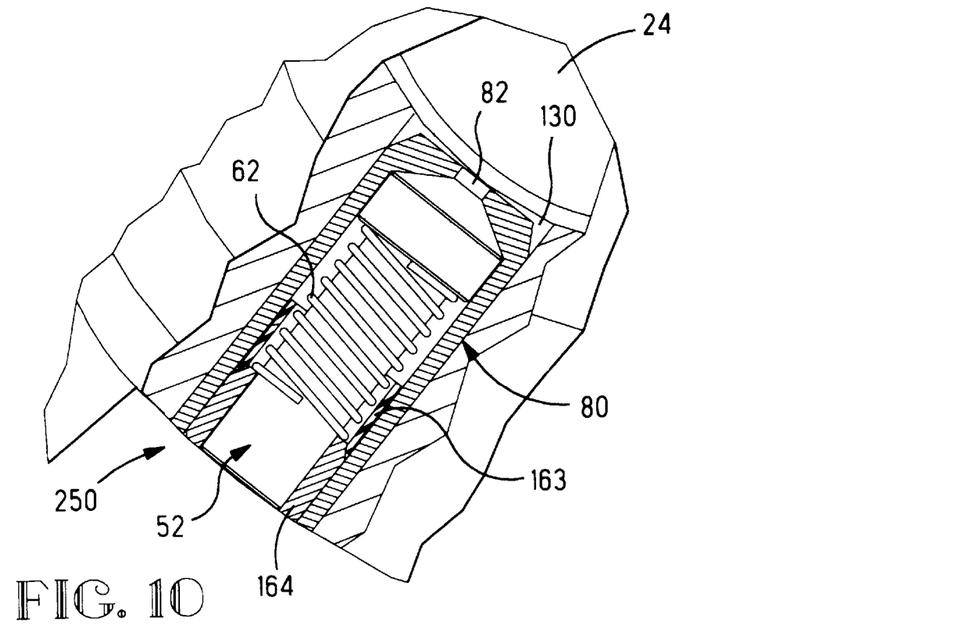
FIG. 10 is a view similar to that of FIG. 8 illustrating a further alternative embodiment of the invention that is a self-contained stop assembly unit, the assembly being in its unextended position when the braking system is not under pressure.
Figure 11:
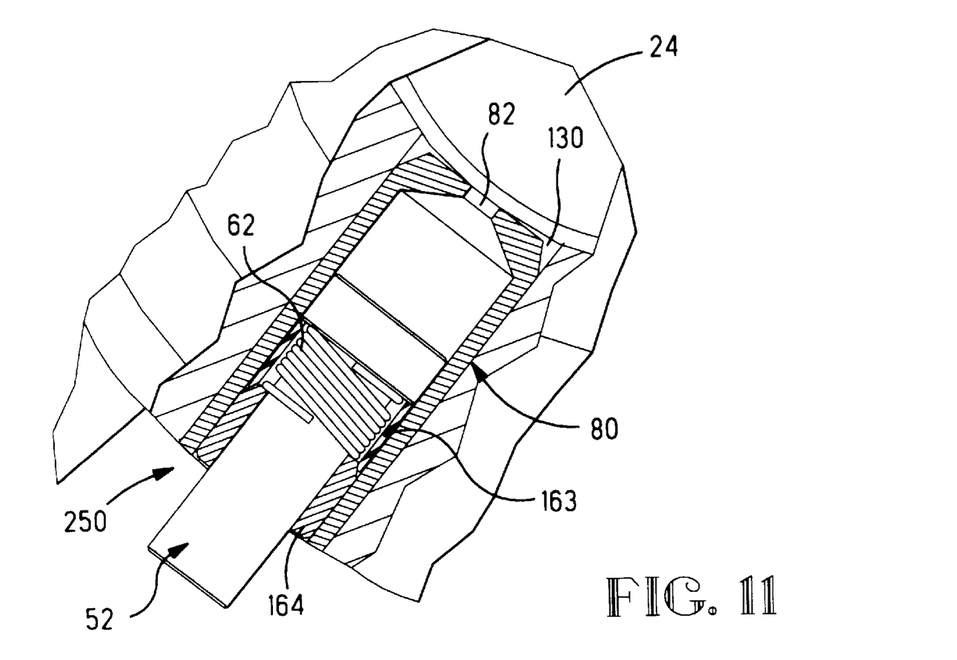
FIG. 11 is a view similar to that of FIG. 9 illustrating the position of the stop assembly of FIG. 10 when the brake system is under pressure.

FIGS. 10 and 11 show a further alternative embodiment 250 of the stop assembly that is a self-contained unit that may be inserted into bore 130 of a gladhand. Embodiment 250 includes a retaining bushing 164, an elastomeric seal 163, a spring 62 and pin 52, all of which are contained in a sleeve 80 dimensioned to be pressfit or otherwise secured within bore 130 in a gladhand. Sleeve 80 includes aperture 82 at the inner end thereof that communicates with the air passageway 24, such that, upon pressurizing the air brake system, pressurized air can flow into the sleeve 80 and activate the stop assembly 250 in the manner previously described.

FIG. 12 shows another alternative embodiment 350 of a self-contained stop assembly in which spring 162 is disposed around the outside of seal 263. Embodiment 350 is shown as a self-contained unit, however, it is to be understood that the spring 62 also may be disposed around seal 63 in the embodiment of FIGS. 8 and 9.

Figure 13:
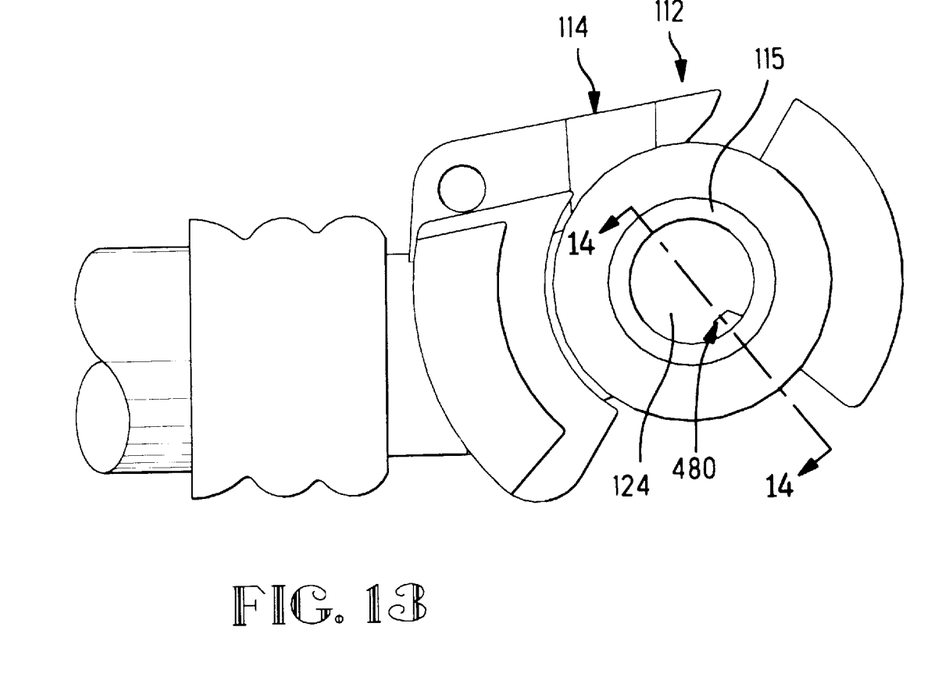
FIG. 13 is a view of a hose coupling member illustrating the coupling side of the member, the member having an alternative embodiment of a self-contained stop assembly.
Figure 14:
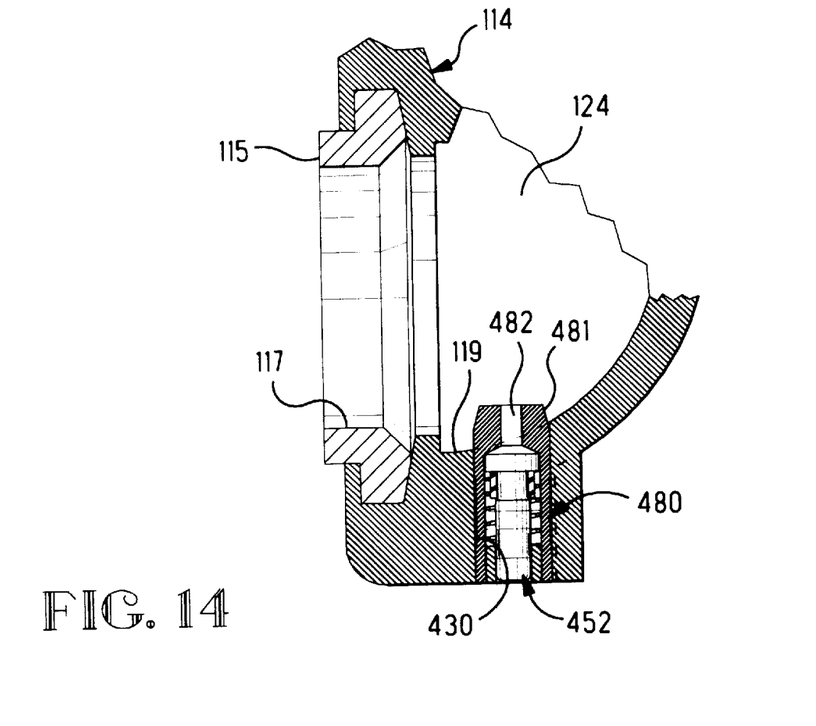
FIG. 14 is a fragmentary cross-sectional view of the coupling member taken along line 14—14 of FIG. 13.

FIGS. 13 through 17 disclose a further embodiment 450 of the stop assembly that is a self-contained unit that may be inserted into a coupling member 112, as best seen in FIGS. 13 and 14. Coupling member 112 includes a housing 114 having a sealing member 115 extending around the opening to air passageway 124 on the coupled face of member 112. Bore 430 extends through the housing 114 and is open to the air passageway 124. The metal sleeve 480 containing the stop assembly 450 is disposed within the bore such that a portion 481 of the sleeve extends into the air passageway 124. Sleeve 480 is dimensioned to be press fit or otherwise secured within the bore 430 of the housing 114. Sleeve 480 includes an aperture 482 at the inner end thereof that communicates with the air passageway 124, such that, upon pressurizing the air brake system pressurized air can flow into the sleeve 480 and activate the stop assembly 450. As best seen in FIG. 14, the leading end of sleeve 480 extends above opening to passageway 124 including the horizontal surface 117 of seal member 115, thus assuring that any moisture that might be collected within housing 114 and trapped at location 119 does not get into the air passageway 482 of sleeve 480.

Figure 15:
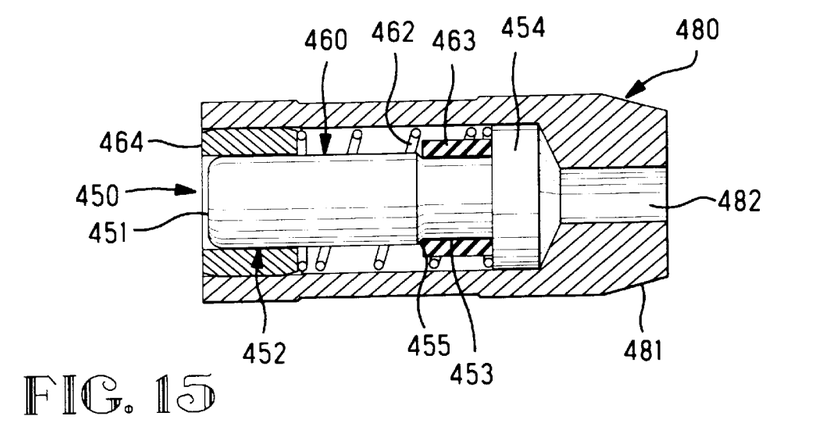
FIG. 15 is a view similar to that of FIG. 8 illustrating the stop assembly embodiment of FIG. 13 in its unextended position when the braking system is not under pressure.
Figure 16:
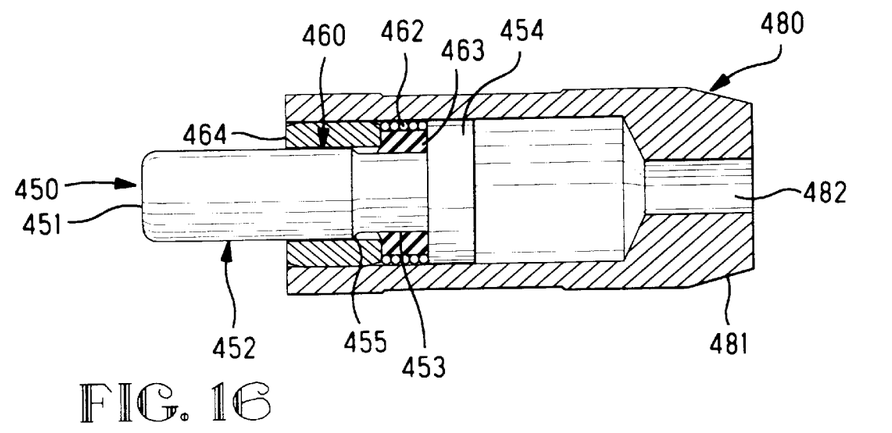
FIG. 16 is a view similar to that of FIG. 9 illustrating the position of the stop assembly of FIG. 13 when the brake system is under pressure.
Figure 17:
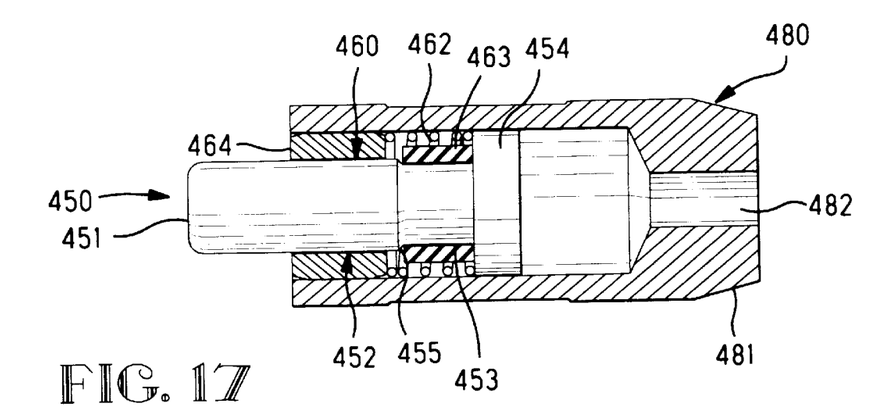
FIG. 17 is a view illustrating the position of the stop assembly of FIG. 13 when venting the pressurized brake system.

Stop assembly 450, as best seen in FIGS. 15 through 17 includes retaining bushing 464, elastomeric sleeve member 463, a spring 462 and a pin 452, all of which are contained in the metal sleeve 480. Pin 452 includes an enlarged flange portion 454 at the inner end thereof and a pin shaft 460 extending forwardly therefrom. Pin shaft 460 includes a recessed portion 453 extending a selected distance between the flange portion 454 and the leading end of pin shaft 460. The length of the recessed portion 453 is dimensioned to receive the elastomeric seal member 463. Shaft 460 defines a stop surface 455 at the forward end of the recess 453 such that the leading edge of the elastomeric seal member 463 is engaged by the stop surface 455, thus assuring that the seal member 463 is moved rearwardly within the sleeve 480 when the pin 452 is in its retracted position. Spring 462 is disposed around the seal 463.

The recessed portion 453 of the pin 452 allows the seal member 463 to be thicker than the seal members shown in FIGS. 8 through 12 and thus more tear resistant. Additionally stop assembly embodiment 450 provides a safety feature when it becomes necessary to manually disengage to air hoses that are under pressure. Because the seal moves inwardly with the pin, it is possible to vent the system when the pin is manually depressed such that the seal is moved rearwardly of inner face of the bushing 64. Typically, when two adjacent railroad cars are to be disconnected when the brake system is still under pressure, the system can be turned off at each of the cars by shutting a valve. The hoses between the two cars, however, remain under pressure. The sudden release of pressure as the hoses are disconnected can cause a hose to injure the person who is disconnecting them.

Figure 18:
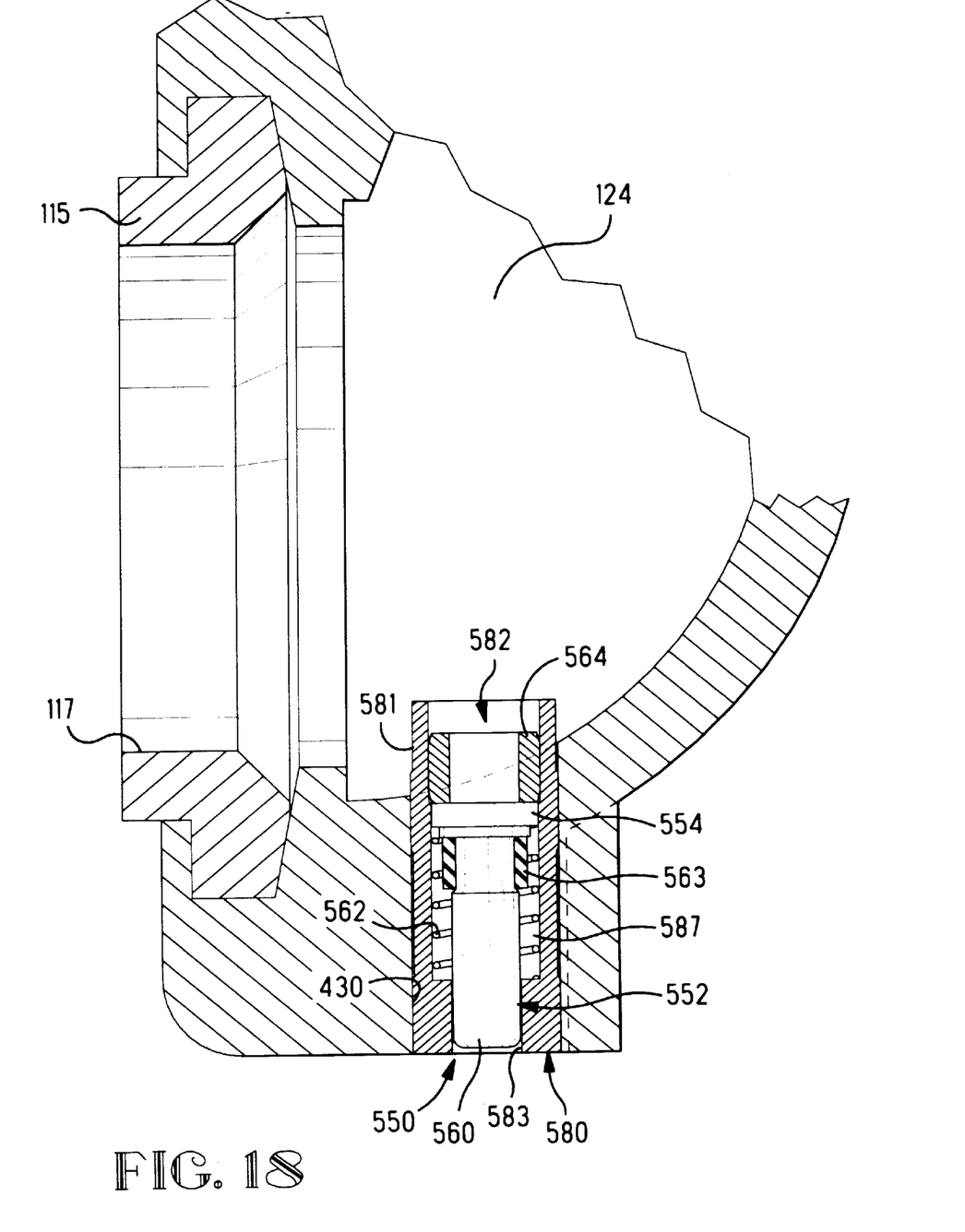
FIG. 18 is a view similar to that of FIG. 14 illustrating another embodiment of a self-contained stop assembly when the brake system is not under pressure.
Figure 19:
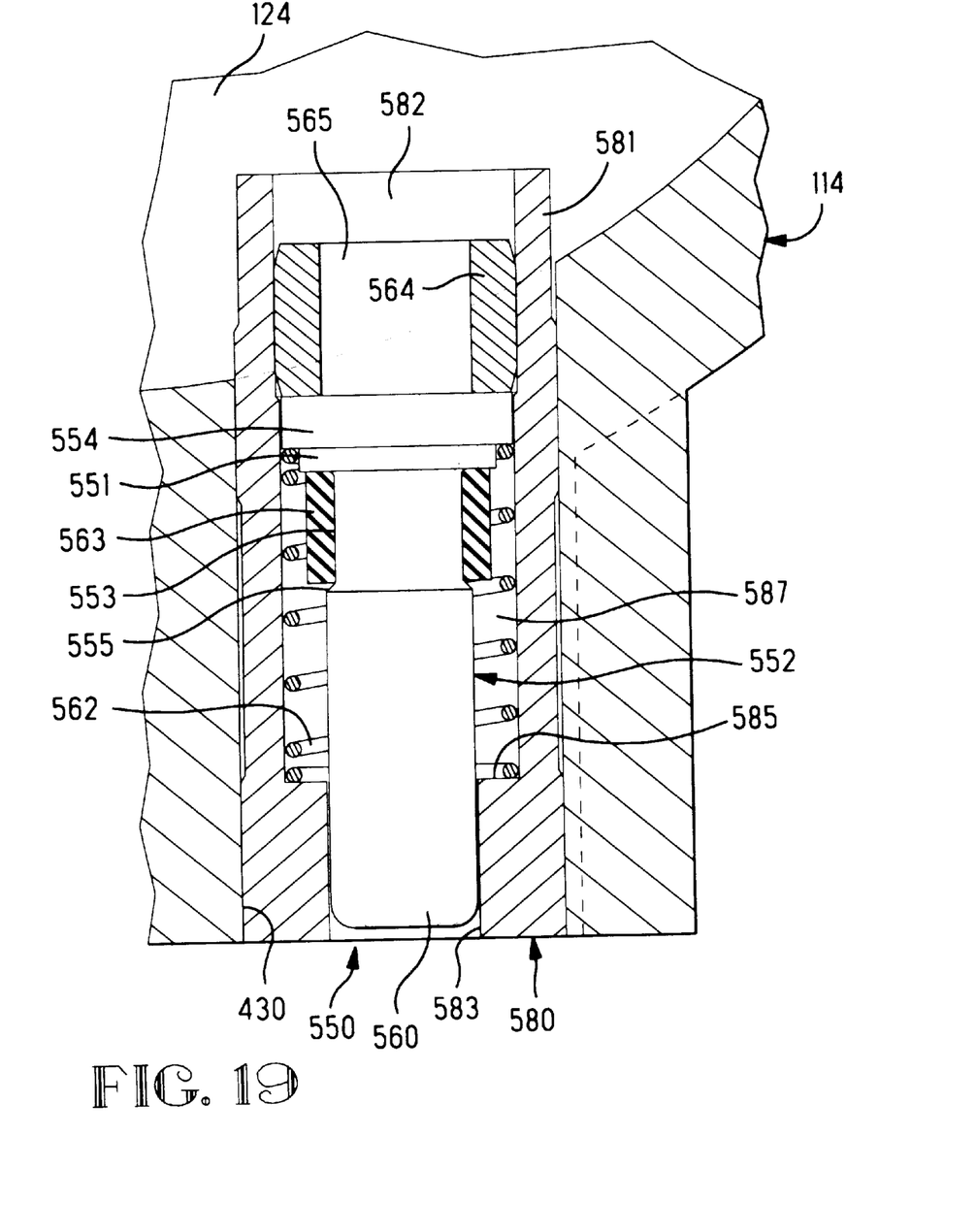
FIG. 19 is an enlarged view of the self-contained stop assembly of FIG. 18.
Figure 20:
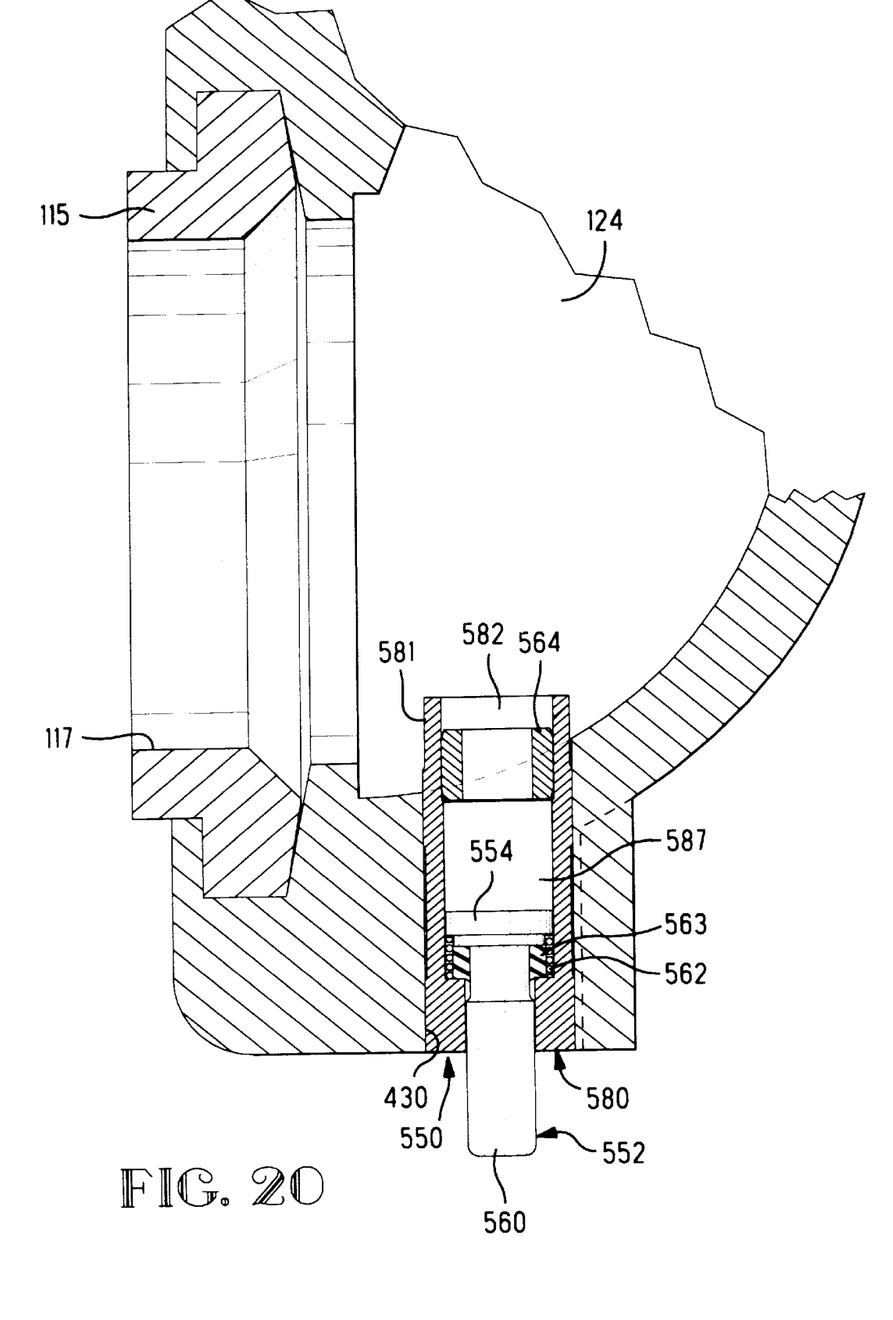
FIG. 20 is a view illustrating the position of the stop assembly of FIG. 18 when the brake system is under pressure.

FIGS. 18, 19 and 20 illustrate another embodiment 550 of a self-contained stop assembly that may be inserted into the coupling member 112 described above. A metal sleeve 580 containing the stop assembly 550 is dimensioned to be press fit or otherwise secured within the bore 430 such that a portion 581 of the sleeve 580 extends into the air passageway 124. Sleeve 580 includes a configured aperture 582 having a smaller portion 583 at the outer end thereof dimensioned to receive only the leading end of shaft 560 of pin 552. The remaining portion 587 of the aperture 582 is dimensioned to receive the remaining members of the stop assembly. The inner end of portion 587 communicates with the air passageway 124, such that, upon pressurizing the air brake system pressurized air can flow into the sleeve 580 and activate the stop assembly 550. The inner end of sleeve 580 extends above opening to passageway 124 including the horizontal surface 117 of seal member 115, in the same manner as embodiment 480 previously described. Sleeve 580 includes an inner stop surface 585 defined at the transition between forward aperture portion 583 and rearward portion 587.

Stop assembly 550 includes retaining bushing 564 having aperture 565 extending therethrough, elastomeric sleeve member 563, a spring 562 and a pin 552, all of which are contained in the metal sleeve 580 and are inserted from the inner end of portion 587 of aperture 582. Pin 552 includes an enlarged flange portion 554 and a smaller flange portion 551 at the inner end thereof and a pin shaft 560 extending forwardly therefrom. Pin shaft 560 includes a recessed portion 553 extending a selected distance between flange portion 551 and the leading end of pin shaft 560. The length of the recessed portion 553 is dimensioned to receive the elastomeric seal member 563. Shaft 560 defines a stop surface 555 at the forward end of the recess 553 such that the leading edge of the elastomeric seal member 563 is engaged by the stop surface 555, thus assuring that the seal member 563 is moved rearwardly within the sleeve 580 when the pin 552 is in its retracted position. Spring 562 is disposed around the seal 563. In this embodiment, retaining bushing 564 is inserted from the inner end of aperture 582 and secured therein in an interference fit or by other methods known in the art. Upon pressurizing the brake system, pin 552 is moved forwardly until shaft 560 extends outwardly from aperture portion 583, spring 562 is compressed and the leading end of seal member 563 engages stop surface 585, as shown in FIG. 20.

An advantage of the embodiment shown in FIGS. 18 through 20 is that the number of metal to metal interfaces at the outer surface of housing 114 is less than those of previous embodiments, thus minimizing the number of potential sites for leakage of air. Another advantage is that the (amount of) interference fit between bushing 564 and the inner sleeve surface needs only to be sufficient enough to maintain the other members of the stop assembly within the sleeve 580 when the retention spring resiles from its compressed state as air pressure is released, whereas in the other designs, the interference fit must resist both the air pressure and the stress from the compressed spring.

It is to be understood that only one of the gladhands needs to have the locking mechanism in an accordance with the present invention to prevent inadvertent disconnecting of the gladhands after the lines have been charged. The gladhand having the locking structure will mate with all undamaged standard gladhands currently in use by the railroad industry, whether they have a mechanically operated lock or no lock.

As can be understood from the foregoing description, the air pressure actuated stop assembly can be readily incorporated into existing gladhand designs with minimal manufacturing changes.

If it becomes necessary to disengage the gladhands when the pneumatic braking system is charged, the pin 62 of the stop assembly 50 can be manually pushed into the housing bore 30 and the air hoses 70 can then be manually separated.

The air pressure actuated stop assembly 50 of the present invention eliminates the manual labor, the time for engaging a manual lock, and problems associated with manually operated devices when coupling the air hoses 70. Additionally, a manual locking feature may be on the side of the gladhand that is facing away from the employee and be obscured from sight by the structure of the gladhand itself and, thus, may not be engaged by the employee.

Since the electro-pneumatic braking system is pressurized at all times while a train is in service, the pin 52 will remain extended at all times, unlike in a conventional air brake system where the pressure varies between off and full pressure, which could allow a pin to retract and extend several times during a trip. This feature is particularly important for electro-pneumatic systems that have electrical connectors secured to or is part of the coupling housings, such as the system disclosed in U.S. patent application Ser. No. 08/708,435 and International Patent Application No. WO 97/09754. In a conventional air brake system, on the other hand, if the pressure is sufficiently reduced, the pin would retract thus possibly allowing the coupling members 12 to inadvertently separate.

It is thought that the automatic locking mechanism of the present invention and many of it attendant advantages will be understood from the foregoing description. It is apparent that various changes may be made in the form, construction, and arrangement of parts thereof without departing from the spirit or scope of the invention, or sacrificing all of its material advantages.

We claim:

1. A locking mechanism for an air brake hose coupling for a pneumatic braking system, said coupling having first and second rotatably engaging housings with mating portions thereon for securing said housings together, and which are affixed to ends of respective associated hoses to complete an air passageway therebetween when the housings are coupled, the housings becoming secured in a coupled relationship upon relative rotation and engagement of said mating portions, each of said housings having a portion having an exterior surface adjacent an interior surface of a complementary portion of the other housing and slidable therealong during coupling and uncoupling of said housings, at least one of said housings including said locking mechanism, said mechanism comprising:

an air pressure actuated stop assembly in the portion of at least one of said housings, said stop assembly including a pin movable between a recessed position and an extended position, said pin being spaced from an end of said portion of the opposite connector housing and in the path thereof, said pin being movable when actuated by air pressure in said air brake hose to said extended position to obstruct the path traveled by said opposite connector housing portion in a rotatable direction uncoupling said two housings thereby preventing inadvertent uncoupling of said housings when said air brake system is pressurized, while permitting limited movement of said opposite connector along said path.

2. The locking mechanism of claim 1 wherein said air pressure actuated stop assembly includes a compression spring, said pin being biased by said spring to a recessed position when said air brake system is not pressurized.

3. The locking mechanism of claim 1 wherein said housing includes a bore extending from an exterior surface thereof to said air passageway of said braking system, said air pressure actuated stop assembly being disposed within said bore.

4. The locking mechanism of claim 3 wherein said stop assembly is a self-contained unit configured to be secured in said bore of said housing, said unit including an outer sleeve having a spring biased pin disposed therein, whereby when said unit is secured in said bore, an opening in said sleeve is in communication with said air passageway and said pin moves to an extended position when actuated by said air pressure.

5. The locking mechanism of claim 3 wherein said air pressure actuated stop assembly includes a spring biased pin that moves to an extended position when actuated by said air pressure.

6. The locking mechanism of claim 5 wherein said bore includes a first portion dimensioned to slidingly receive said stop assembly, and a second portion having a diameter smaller than said first portion extending from an innermost end of said first portion to said air passageway.

7. The locking mechanism of claim 5 wherein said stop assembly further includes a retaining bushing to secure said assembly in said bore in an interference fit.

8. The locking mechanism of claim 7 wherein said retaining bushing defines an interference fit with an inner wall of said bore entirely therearound defining an air seal between said bore and said retaining bushing to minimize air leaks around the stop assembly.

9. The locking mechanism of claim 8 wherein an elastomeric sleeve is disposed around said pin and dimensioned to slidingly receive said pin as said stop assembly is activated and released, a compression spring being disposed over said seal and biasing said pin, said elastomeric sleeve assisting in sealing against said stop assembly.

10. The locking mechanism of claim 8 wherein a compression spring is disposed over said pin and an elastomeric sleeve is disposed around said spring and said pin and dimensioned to slidingly receive said spring and pin as said stop assembly is activated and released, said elastomeric sleeve assisting in sealing against said stop assembly.

11. The locking mechanism of claim 4 wherein said spring biased pin has a recessed portion at an inner end of a shaft portion, said recessed portion being dimensioned to receive an elastomeric air seal such that said seal moves with the pin as said pin is moved between the extended and released positions, whereby said seal prevents pressurized air from escaping when said pin is in its extended position and allows air to escape when said seal is moved inwardly.

12. The locking mechanism of claim 11 wherein said spring of said stop assembly is disposed around said elastomeric air seal.

13. The locking mechanism of claim 4 wherein said outer sleeve extends a selected distance into said air passageway.

14. The locking mechanism of claim 3 wherein said stop assembly is inserted into said bore from said exterior surface of said housing.

15. The locking mechanism of claim 3 wherein said stop assembly is inserted into said bore from an end in said air passageway.

16. The locking mechanism of claim 4 wherein said outer sleeve includes an aperture extending from said air passageway to said exterior of said housing, said aperture having a forward portion and an inner portion, said forward portion being dimensioned to receive a leading end of a shaft of said pin therein, and said inner portion being larger than said forward portion, said portions defining a stop surface within said opening, said inner portion being dimensioned to receive a flange and a spring of said spring biased pin, said flange portion being larger than said shaft such that upon pressurizing said air brake system, said shaft of said spring biased pin is extended from said housing and said internal stop surface cooperates with said spring and flange to hold remaining portions of said stop assembly within said sleeve opening.

17. The locking mechanism of claim 16 wherein said pin of said stop assembly further includes an elastomeric air seal disposed around said pin forwardly of said flange, a forward end of said seal engaging said internal stop surface when said pin is in its extended position.

18. The locking mechanism of claim 17 wherein said stop assembly further includes a retaining bushing disposed in said sleeve opening rearwardly of said flange of said pin to hold said stop assembly in said sleeve.

* * * * *